(12) United States Patent
Spencer et al.

(10) Patent No.: US 6,233,128 B1
(45) Date of Patent: May 15, 2001

(54) DATA RETENTION IN A CIRCUIT BREAKER

(75) Inventors: George Auther Spencer, Plano; Robert Henry Clunn, Richardson, both of TX (US)

(73) Assignee: George A. Spencer, Wylie, TX (US)

( * ) Notice: Subject to any disclaimer, the term of this patent is extended or adjusted under 35 U.S.C. 154(b) by 0 days.

(21) Appl. No.: 09/277,878

(22) Filed: Mar. 29, 1999

(51) Int. Cl.$^7$ .................................................. H02H 3/18
(52) U.S. Cl. ................... 361/86; 361/92; 361/79
(58) Field of Search .................. 361/78, 79, 86, 361/87, 92, 93.1, 93.2; 702/57–58, 64–65; 307/64, 116

(56) References Cited

U.S. PATENT DOCUMENTS

| | | | |
|---|---|---|---|
| 4,827,149 | * | 5/1989 | Yabe ........................................ 307/64 |
| 4,949,214 | * | 8/1990 | Spencer .................................... 361/95 |
| 5,384,747 | * | 1/1995 | Clohset ................................... 365/226 |
| 5,875,087 | * | 2/1999 | Spencer et al. .......................... 361/87 |

* cited by examiner

Primary Examiner—Michael J. Sherry
(74) Attorney, Agent, or Firm—Howison, Chauza, Thoma, Handley&Arnott, LLP; Gregory M. Howison; Stephen S. Mosher

(57) ABSTRACT

An apparatus and method is disclosed for retaining parameter information generated or received in an electronic circuit breaker (10). The electronic circuit breaker (10) includes a controller and is connected in a branch circuit coupled to a power source via a power line and powered by the power source. Upon occurence of a power fault, a control signal responsive to the power fault is generated and coupled to a control input of the circuit breaker. The control signal causes retention of parameter information generated or received in the electronic circuit breaker (10). Means for retaining the data representing parameter information include charging a storage capacitor to a predetermined value corresponding to the parameter information being retained, writing the parameter information being retained to an EEPROM and writing the data containing the parameter information being retained into a Static RAM. Power signals that can be monitored to provide or initiate the retention of data include sensing the AC voltage input to the branch circuit in which the circuit breaker is connected, sensing the unregulated DC voltage in the power supply that powers the circuit breaker and sensing the charging current of a filter capacitor in the power supply of the circuit breaker.

54 Claims, 2 Drawing Sheets

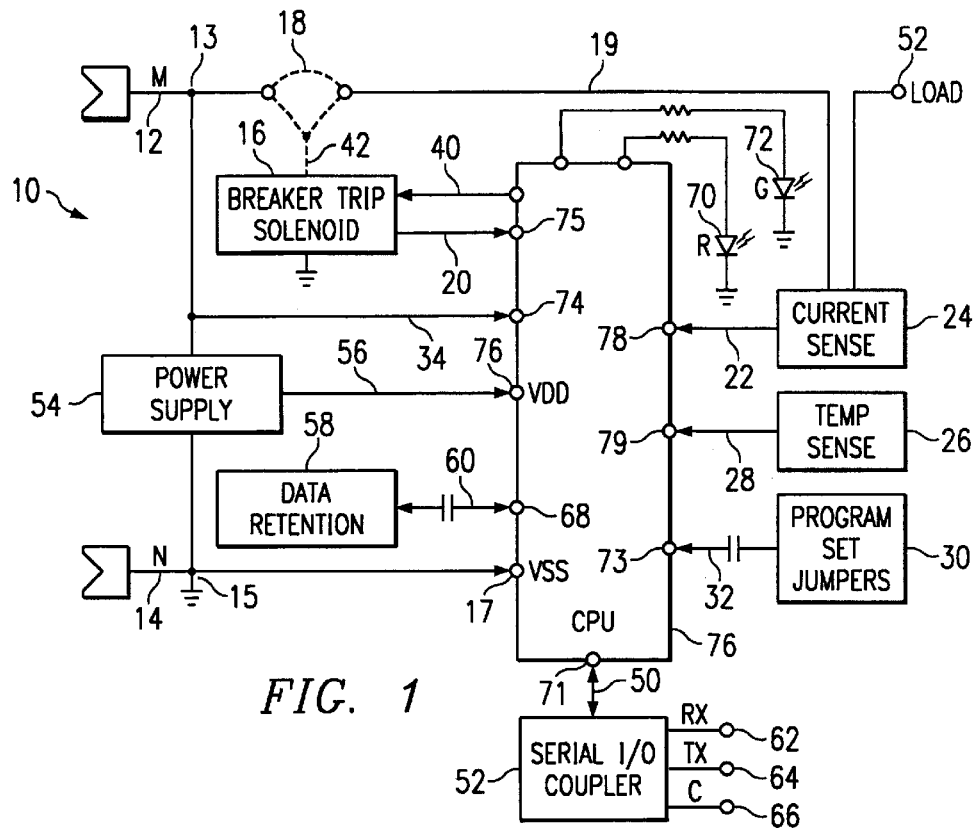

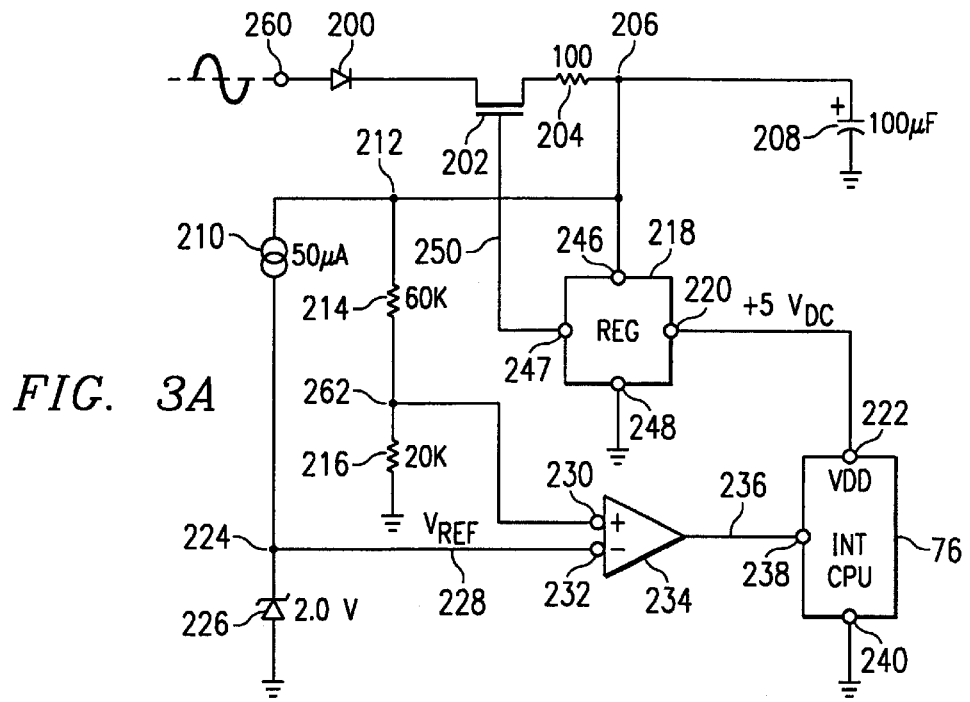
FIG. 3A
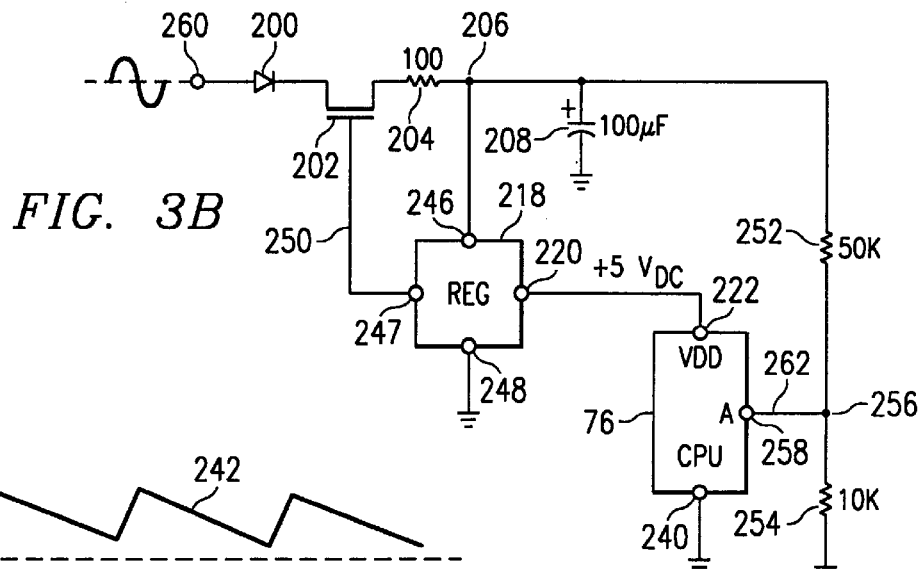
FIG. 3B
FIG. 4A
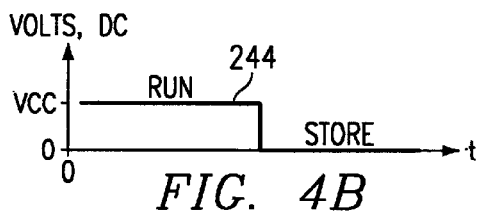
FIG. 4B

DATA RETENTION IN A CIRCUIT BREAKER

CROSS REFERENCE TO RELATED APPLICATIONS

The present application is related to U.S. Pat. No. 5,875,087, issued Feb. 23, 1999 to Spencer, et al. and entitled "CIRCUIT BREAKER WITH INTEGRATED CONTROL FEATURES" U.S. Pat. No. 4,949,214, issued Aug. 14, 1990 to George A. Spencer and entitled "DELAY OVERRIDE FOR ELECTRICAL CIRCUIT BREAKERS," and currently pending U.S. patent application Ser. No. 09/253,465, filed Feb. 19, 1999 and entitled "CIRCUIT BREAKER WITH INTEGRATED SELF-TEST FEATURES" which application is a Continuation of U.S. Pat. No. 5,875,087 issued Feb. 23, 1999 to Spencer, et al.

TECHNICAL FIELD OF THE INVENTION

The present invention pertains in general to electronically controlled circuit breakers and, more particularly, to circuit breakers capable of retaining measured data obtained during operation in a power distribution network.

BACKGROUND OF THE INVENTION

In a typical AC power distribution system in a residential or a small business building, an array of electromechanical circuit breakers protects various branch circuits of the electrical wiring. Such circuit breakers utilize a thermally operated switch which, upon reaching a predetermined temperature due to excessive current passing therethrough, will "trip" and open the circuit connected to the switch.

Improved circuit breakers providing very rapid trip response and the ability to monitor circuit conditions and store data related thereto are disclosed in U.S. Pat. No. 4,949,214, entitled "TRIP DELAY OVERRIDE FOR ELECTRICAL CIRCUIT BREAKERS" issued to George A. Spencer on Aug. 14, 1990, an assignee of the present U.S. patent application, and in U.S. Pat. No. 5,875,087 entitled "CIRCUIT BREAKERS WITH INTEGRATED CONTROL FEATURES", issued to Spencer, et al. and assigned to the assignee of the present application, which patents are incorporated herein by reference. The improved circuit breakers disclosed therein include an array of trip profiles tailored to the current draw characteristics of the various kinds of devices which may be connected to the AC power line branch circuit protected by the circuit breaker. These trip profiles, which are dynamically changeable, determine the current versus time configuration of the particular circuit breaker. Such improved circuit breakers overcome the principal disadvantages of the conventional thermally operated circuit breakers, including, for example, slow response time, inability of responding to differing in-rush current characteristics, inability of opening a circuit upon the occurrence of arcing (a potentially serious fire hazard), inadequate response to electrical stalling of motors connected to a protected line, etc.

Although the circuit breakers with trip delay override and the electronically controlled circuit breakers with integrated control features referenced above offer superior trip performance under a variety of load fault conditions, neither of the aforementioned advanced circuit breakers has the capability of storing substantial quantities of important system data obtained by the circuit breaker while monitoring the protected circuit, even for short interruptions of power.

Thus, there is a need for means to save the critical data in an electronic circuit breaker when the input power supply departs from normal specifications, in whatever degree and for whatever reason.

SUMMARY OF THE INVENTION

The present invention disclosed and claimed herein comprises an apparatus and method and for retaining parameter information generated or received in an electronic circuit breaker in the event of momentary or extended power interruptions. The electronic circuit breaker having a controller is connected in a branch circuit coupled to a power source via a power line and powered by the power source. Upon occurence of a power interruption or fault, the electronic circuit breaker includes means for generating a control signal responsive to the power fault; means for coupling the control signal to a control input of the circuit breaker and means for storing, responsive to the control signal, parameter information generated in or received by the electronic circuit breaker. The means for generating the control signal includes means for monitoring the power signal, comparing the power signal with a reference signal and means for outputting a control signal when the power signal falls below the reference signal. Data representing parameter information may be retained by charging a storage capacitor to the value corresponding to the parameter information being retained, by writing the parameter information being retained to an EEPROM or by writing the data containing the parameter information being retained into a Static RAM. Power signals that can be monitored to provide an early warning of the power interruption or fault to the circuit breaker and initiate the retention of data include sensing the AC voltage input to the branch circuit in which the circuit breaker is connected, sensing the unregulated DC voltage in the power supply that powers the circuit breaker and sensing the charging current of a filter capacitor in the power supply of the circuit breaker.

BRIEF DESCRIPTION OF THE DRAWINGS

For a more complete understanding of the present invention and the advantages thereof, reference is now made to the following description taken in conjunction with the accompanying Drawings in which:

FIG. 1 illustrates a block diagram of the electronic circuit breaker of the present invention;

FIG. 2a illustrates a block diagram of a circuit for data retention utilizing a storage capacitor to retain parameter information;

FIG. 2b illustrates a block diagram of a circuit for data retention utilizing an Electrically Erasable Programmable Read-Only Memory to retain parameter information, FIG. 2c illustrates a block diagram of a circuit for data retention utilizing a Static Random Access Memory to retain parameter information;

FIG. 3a illustrates a block diagram of a circuit for providing a control signal to initiate data retention which utilizes a comparator integrated in the power supply of the electronic circuit breaker;

FIG. 3b illustrates a block diagram of a circuit for providing a control signal to initiate data retention which utilizes a comparator function implemented within the microprocessor of the electronic circuit breaker;

FIG. 4a illustrates a voltage waveform of the unregulated DC voltage in the power supply illustrated in FIGS. 3a and 3b; and FIG. 4b illustrates a control signal generated by the comparator in the power supply of FIG. 3a.

DETAILED DESCRIPTION OF THE INVENTION

Referring now to FIG. 1, there is shown a block diagram of an electronic circuit breaker 10 of the type used in conjunction with the present invention. Each circuit breaker of the type shown in the preferred embodiment of FIG. 1 includes a CPU 76 connected to a plurality of sense inputs, a serial I/O communication port, a power supply and a non-volatile memory in data retention circuit 58 sufficient to store basic configuration parameters and addresses which are entered during manufacturing. The incoming main power line 12 is connected to a node 13 and further to the input of breaker element 18. The output of breaker element 18 is further connected through a line 19 to the input of the current sense circuit 24 of the circuit breaker 10. The output of the current sense circuit 24 is connected to the load terminal 52. The neutral power line at line 14 is connected to the ground terminal 15 of the circuit breaker 10 and also to the ground terminals of the power supply 54 and CPU 76 at the $V_{SS}$ pin 17.

Continuing with FIG. 1, AC voltage is supplied to power supply 54 from node 13. The output of power supply 54 is supplied on line 56 to the VDD terminal of CPU 76. Node 13 at the input to breaker element 18 is connected through line 34 to the first voltage sense input 74 of CPU 76. A second voltage sense input 75 to CPU 76 is provided from the neutral side of breaker trip solenoid 16 via line 20. The purpose of providing two voltage sense inputs will be described in detail hereinafter. It will be appreciated, however, that the first voltage sense input is responsive to voltage changes that occur upstream from the circuit breaker 10; that is, changes such as voltage dropouts which will affect all circuit breakers in the system. The second voltage sense input is also responsive to upstream voltage changes as long as the breaker has not tripped. Since both voltage inputs responsive to the voltage on the AC power line are connected to opposite sides of the breaker trip solenoid 16, sensing both lines 20 and 34 may be used to test the solenoid coil in breaker trip solenoid 16. Moreover, the first voltage sense input 74 may also be used to sense conditions on the upstream side of the circuit breaker after it has tripped.

Continuing with FIG. 1, circuit breaker element 18, which is of the type of circuit breaker described in detail in U.S. Pat. No. 5,875,087 issued Feb. 23, 1999, entitled "CIRCUIT BREAKER WITH INTEGRATED CONTROL FEATURES" and incorporated by reference herein in its entirety, includes a trip override feature which is supplied by breaker trip solenoid circuit 16 shown in FIG. 1 of the present application. The output of breaker trip solenoid circuit 16 is applied through control path 42 to operate the solenoid contacts to cause breaker element 18 to trip immediately upon an appropriate trip signal supplied by CPU 76. A trip signal is provided over line 40 from CPU 76 to the input of the breaker trip solenoid circuit 16.

Continuing further with FIG. 1, an output for each of the visible indicators, a red light-emitting diode 70 and a green light emitting diode 72, is provided. Each of these light emitting diodes (LEDs) 70 and 72 are provided as outputs by CPU 76 to provide visual indicators of conditions within the CPU 76 of the circuit breaker 10. CPU 76 further has an input line 22 which connects the output of the current sense circuit 24 to CPU 76 to an input 78 for sensing the load current by the CPU 76. There is further provided the output of temperature sense unit 26 through line 28 to another input 79 of CPU 76 for monitoring the temperature of the circuit breaker. There is yet another set of lines denoted as program lines 32 between program jumper set 30 and terminal 73 of CPU 76. The program jumper set 30 provides for programming various functions of the terminal 71 of CPU 76 in response to particular circumstances of the installation in which the circuit breaker shown in FIG. 1 is used. There is also shown in FIG. 1 the serial I/O coupler connected to CPU 76 through line 50. Line 50 enables bi-directional data communication between CPU 76 and a compatible terminal connected to the communication bus represented by the receive, the transmit and the common lines attached to the serial I/O coupler 52. In the typical installation, the three-wire bus connected to the output of serial I/O coupler 52 provides a bi-directional communication path between the circuit breaker 10 and an external device or computer.

In FIG. 1, other features of the electronic circuit breaker 10 include first, a parameter measurement and storage capability within CPU 76 for measuring and storing performance parameters. The controller within CPU 76 compares outputs of current sense unit 24, the temperature sense unit 26, and the voltage sense units through lines 20 and 34 to generate control signals when these parameters exceed the predetermined operating thresholds stored within CPU 76. Second, the input/output port at terminal 71 provided by the serial I/O coupler 52 enables communication with a device or a computer external to the circuit breaker. This allows information to be transmitted in both directions between the external device and the electronic circuit breaker 10. The controller within CPU 76 is therefore operable to receive data via the serial input/output port 52 regarding new desired operating relationships or trip profiles for storage in the memory within CPU 76. For example, data can be uploaded from the circuit breaker to the external or remote computer or new trip profiles for the operation of the circuit breaker can be downloaded from the external or remote computer. Moreover, remote control of the circuit breaker can be used to override the trip mechanism in the circuit breaker and trip the circuit breaker in certain conditions. In another example, in the event of fire conditions detected within the building that houses circuit breakers of the type disclosed herein, a command can be issued to the circuit breaker 10 to trip a particular branch circuit in the vicinity of the detected fire hazard. Further, remote control can be used to disable the trip override feature in a circuit breaker 10 so that it will operate as a conventional, thermally operated circuit breaker, for example during maintenance.

Associated with the parameter measurement and storage capabilities within circuit breaker 10 is a data retention circuit 58 coupled to terminal 68 of CPU 76 via bus 60. Data retention circuit 58 is provided for non-volatile storage of data generated or received by the circuit breaker 10 in the event of a power source interruption or other fault affecting the system input power that could result in a loss of data. As will be described in detail hereinafter, the data retention circuit may be implemented in several different ways. Moreover, several means of implementing an early warning signal to initiate rapid storage of data in the data retention circuit will also be described in detail hereinbelow.

Continuing further with FIG. 1, a zero-crossing detector within CPU 76 makes use of inputs provided by both the current sense circuit 24 and the voltage sense inputs 74 and 75. Voltage dividers (not shown in FIG. 1) reduce the input voltage to a level within the ratings of the zero crossing detector circuits within CPU 76. The zero-crossing detector can determine, from the waveforms present at these two inputs to CPU 76, the phase angle of the current flowing in the load relative to the voltage supply to the load, thus determining the type of load that is connected to load terminal 52. Thus, characteristics peculiar to the particular load can be known and the trip profile for an individual circuit breaker adapted to the particular load. Furthermore, within an individual circuit breaker, a non-volatile memory contains a family of trip profile curves. Thus, the trip profile needed for a particular kind of load can be retrieved from the family of trip profiles stored in memory. These trip profiles are selectable either by the user or as a function of the measured parameters determined by the circuit breaker from inputs provided by the current sense circuit 24, temperature sense unit 26 or the first and second voltage sense inputs through lines 34 and 20.

Continuing with the operation of the circuit breaker 10 shown in FIG. 1, the circuit breaker 10 is programmed, in effect, to take snapshots of multiple data values during or at the end of each half cycle of the incoming AC power line signal. This data will be saved in the memory buffer of the circuit breaker 10 within CPU 76 until the circuit breaker 10 offloads the data to an external device or computer. In normal operation, the external device can collect the data for an individual circuit breaker during one full AC cycle. An external device having the capability of communicating with the electronic circuit breaker described herein is disclosed in copending U.S. Pat. No. 5,982,596, which is incorporated herein by reference in its entirety.

In operation, the CPU 76 shown in FIG. 1 receives voltage sense inputs from the first input 74 connected to the incoming AC supply voltage and also from the second input 75 connected to the neutral side of the breaker trip solenoid 16. The first voltage sense input thus detects voltage dropouts which may be caused by arcing across an open circuit or a loose connection in the upstream circuit or across the hot and neutral wires in the upstream circuit. Such a condition would affect all the circuit breakers 10 served by the malfunctioning power line.

In another fault condition, suppose the external device receives time-stamped data from a plurality of circuit breakers 10 operating in a system indicating that arcing or dropouts are occurring in several circuit breakers 10 at the same time. The external device may then interpret this condition as a loose or open connection in the neutral wire because of the coincident, similar data from several branch circuits and accordingly activate an alarm.

Referring now to FIG. 2 there are illustrated three different circuits for providing data retention in an electronic circuit breaker 10 according to the present invention. FIG. 2a illustrates the use of an external storage capacitor to retain a parameter value. In FIG. 2a is shown the CPU 76, which is the CPU 76 of the electronic circuit breaker 10 shown in FIG. 1. CPU 76 includes a data port at terminal 122, a gate port at terminal 124, and an address port at terminal 126. An analog switch 102 is coupled between port 122 via line 116 and one end of resistor 104. The other end of resistor 104 is coupled to node 110. The gate of analog switch 102 is coupled via line 118 to terminal 124 on CPU 76. Node 110 is coupled via line 112 to the input 114 of buffer 108. The output of buffer 108 is coupled by a line 120 to terminal 126, which is an address port of CPU 76. Storage capacitor 106 is coupled between node 110 and ground.

During operation, data is present at certain times at data port 122. When CPU 76 is signaled to retain parameter information, CPU 76 then outputs a gate drive signal at gate port 124 via line 118 to the gate of analog switch 102. As a result, the analog switch 102 is turned on and the data present at data port 122 is coupled through resistor 104 and node 110 to charge storage capacitor 106 through the resistance of resistor 104. Thus, the data value or parameter value is represented by the charge on storage capacitor 106, which is proportional to the parameter value. Typically, the parameter value can be saved by this method for one to two seconds, depending upon the width of the gate drive pulse 130, the RC time constant of resistor 104 and storage capacitor 106 and the leakage current specification of the storage capacitor 106. Persons skilled in the art will also appreciate that the gate drive pulse 130 for turning on analog switch 102 must be long enough to enable a storage capacitor 106 to completely charge up to the parameter value through resistor 104 and the drain-source ON resistance of analog switch 102 during the period of gate drive pulse 130. It will also be appreciated that only a single parameter value can be stored in each capacitor connected as shown in FIG. 2a. Data is read from the storage capacitor 106 via line 112 coupled between node 110 and the input 114 to buffer 108. The data is further coupled to the address port 126 via line 120 from the output of buffer 108. The data input to the microprocessor or the CPU 76 at address port 126 is then fed internally to the analog-to-digital convertor of the CPU 76.

FIG. 2b illustrates a second circuit for data retention 140 that includes a CPU 76 equipped with data terminal 148 and clock terminal 150. The data terminal 148 is coupled by a data line 144 to terminal 152 on EEPROM 142. The clock signal at terminal 150 is coupled by a clock line 146 to terminal 154 on EEPROM 142. In operation, the presence of a control signal within the CPU 76 indicating that data is to be retained causes data to be output at port 148 to EEPROM 142 under the control of the clock signal along clock line 146. A typical write time for data transfer in this circuit is about one to two milliseconds per byte while the retention time for data stored in the EEPROM 142 is in excess of twenty years. The total amount of data that can be stored in this manner is a function of the capacity of the EEPROM 142 which typically is 1K to 16K bytes of data. Since the data line 144 and the clock line 146 are bidirectional, data is read from the EEPROM 142 via lines 144 and 146 when power is restored to the electronic circuit breaker 10.

In FIG. 2c a third circuit for data retention 160 is shown that includes CPU 76, data terminal 168 and clock terminal 170. A static RAM 162 is shown powered by DC voltage applied to a VDD terminal 176 from the $V_{CC}$ supply through diode 172 and node 174 to terminal 176. Also coupled to node 174 is a bypass capacitor 178 coupled to ground from node 174. Data line 164 is connected between data terminal 168 on the CPU 76 and the data terminal 180 on the static RAM or SRAM 162. Clock line 166 is coupled between the clock terminal 170 of CPU 76 and the clock terminal 182 of the SRAM 162. In operation, the receipt of a control signal within CPU 76 indicating that data is to be retained causes data to be output at data port 168 to the SRAM 162 at data port 180 under the control of a clock signal from clock output port 170 on the CPU 76 to the clock input port 182 on the SRAM 162. Thus the operation of the data I/O in this third data retention circuit 160 is much the same as for the second data retention circuit 140 shown in FIG. 2b. However, the data retention in the third data retention circuit using the SRAM 162 operates much faster than the data retention circuit employing an EEPROM. For example, approximately 100 microseconds per byte is needed to transfer information in the data retention circuit utilizing the SRAM 162 shown in FIG. 2c. The data retention time is determined by the value of the capacitor 178 connected to node 174 of the SRAM chip 162. Typically, the data retention time is of the order of ten to twenty seconds. The amount of data or parameter information that can be retained by the SRAM 162 is a function of its capacity and is typically 50 to 250 bytes of data. Since the data line 164 and clock line 166 are bidirectional, data is read from the SRAM 162 via lines 164 and 166 when power is restored to the electronic circuit breaker 10.

It will be appreciated that evaluating the three circuits for data retention shown in FIGS. 2a, 2b, and 2c will depend primarily upon the particular parameter information that is to be retained, the amount of parameter information and other circuit constraints such as cost, the time available for data retention, and, of course, capacity of the available storage devices. For example, for rapid storage of nominal amounts of data the SRAM data retention circuit shown in FIG. 2c could be selected. If, on the other hand, large amounts of data needs to be stored and the time available for storage is not critical then the EEPROM data retention circuit of FIG. 2b may be selected, particularly if very long retention time is required. The data retention circuit of FIG. 2a offers simplicity and the ability to store small amounts of data. For example, providing a capacitor for retaining each parameter is suitable for retaining a small number of parameters, one parameter per capacitor, for a relatively short retention time of one to two seconds.

It can also be said of the data retention circuit of FIG. 2c, that the SRAM retention circuit, since its speed is much greater than that of the EEPROM and that data can be written thereto an unlimited number of times, means that critical parameters can be continuously written to the SRAM 162. Moreover, a large amount of data can be saved in a few milliseconds. Data retention time with an external storage capacitor, as shown in FIG. 2c, is on the order of a few seconds as previously noted. However, if a battery is used to power the SRAM 162, data can be saved for several years.

Turning now to FIG. 3, there are illustrated two embodiments of circuits used to provide a control signal to the CPU 76 to cause retention of parameter information in the electronic circuit breaker of the present disclosure. Both FIGS. 3a and 3b illustrate preferred embodiments for apparatus and method of providing the early warning control signal to indicate the need for data retention. In both cases, the unregulated voltage in the DC power supply for the electronic circuit breaker 10 is monitored and used to develop the control signal. In the description which follows, structural components common to both circuits will be referenced with the same reference numerals because of the identical function the referenced component plays in the particular circuit.

Referring now to FIG. 3a, there is shown an AC input terminal coupled to the anode of rectifier 200, which is connected to the drain of a MOSFET switch 202. The source of MOSFET switch 202 is connected to one end of a resistor 204, the other end of resistor 204 being connected to node 206. A large filter capacitor 208 is coupled between a node 206 and ground. Also coupled between node 206 and ground is a voltage divider comprising a node 212 coupled to node 206, a resistor 214 coupled to a node 262, and a resistor 216 coupled between node 262 and ground. The resistor values shown for resistors 214 and 216 are for illustrative purposes to show that the voltage at node 262 is, in this illustrative example, approximately ¼ the total resistance between node 212 and ground. Node 206 is the voltage sense point in the unregulated power supply provided by rectifier 200 and filter capacitor 208 in the electronic circuit breaker 10. A representative waveform 242 at node 206 is shown in FIG. 4a. The waveform 242 illustrates the ripple voltage of the unregulated DC voltage present at node 206. The dashed line corresponding to +8 volts in the waveform 242 is shown to illustrate a limit value which will be discussed in detail hereinbelow.

Continuing with FIG. 3a, there is shown, connected between node 212 and node 224, a current source 210, which is set for a value of typically 50 microamperes in the illustrative example shown in FIG. 3a. Coupled between node 224 and circuit ground is a Zener regulating diode 226 which in the present illustrative example is given a value of 2.0 volts. Returning to node 206 there is coupled a voltage regulator 218 between node 206 and circuit ground. Node 206 is connected to terminal 246 on regulator 218, and terminal 248 of regulator 218 is coupled to circuit ground. The output of regulator 218 is provided at a terminal 220 which in the illustrative example provides a +5 volt DC voltage to VDD terminal 222 of CPU 76. Ground terminal 240 of CPU 76 is connected to circuit ground. CPU 76 is also shown with an interrupt terminal 238. Line 250 shown between regulator 218 and the gate of MOSFET switch 202 provides a gate drive signal from regulator 218 to turn on MOSFET switch 202. It will be appreciated that MOSFET switch 202 is in an ON condition when the circuit breaker 10 is in operation. The data retention control signal is provided by comparator 234 which provides an interrupt signal along line 236 to the interrupt port 238 of CPU 76. The control signal along line 236 in FIG. 4b is shown at waveform 244 with a logic high value for run-time and a logic low value for store. In other words, when line 236 is high, the electronic circuit breaker 10 is in normal operation. When the signal on line 236 drops to a low value, it operates as an interrupt to CPU 76 to retain parameter information.

Comparator 234 has a positive input 230 and a negative input 232. The negative input 232 serves as the reference input and receives a voltage reference from node 224 along line 228 which couples the reference voltage from node 224 to terminal 232 on comparator 234. Similarly, terminal 230 on comparator 234 is coupled from node 262 of the voltage divider described earlier. In operation, when the MOSFET switch 202 is in an ON condition during normal operation of the electronic circuit breaker, the comparator 234 continuously monitors the voltage present at the tap point of the voltage divider comprising resistor 214 and resistor 216. Whenever the voltage at node 206 drops below the 8 volt limit described earlier at waveform 242, the voltage present at terminal 230 of comparator 234 drops below the two volts reference present at terminal 232 provided by diode 226. Thus, at the moment that the voltage at node 262 drops below two volts, or ¼ value of the limit value of 8 volts that is present at node 206, then the output of comparator 234 switches from a high value to a low value indicating to the CPU 76 that it is to retain parameter information.

Referring now to FIG. 3b, there is illustrated an alternate embodiment of a circuit providing a data retention control signal. AC input power is applied to terminal 260 and is rectified by rectifier 200 and the output of rectifier 200 is coupled through the MOSFET switch 202 via its drain and source terminals and current limiting resistor 204 to node 206. Node 206 supplies unregulated DC voltage to terminal 246 of regulator 218, and the ground terminal of regulator 218 is coupled at terminal 248 to circuit ground. Also coupled to node 206 is a large filter capacitor 208 coupled between node 206 and circuit ground. The output of regulator 218 is provided at terminal 220 which provides +5 volts DC to CPU 76 through the line coupling terminals 220 on the regulator 218 and 222 on CPU 76. The ground terminal 240 of CPU 76 is coupled to circuit ground. Regulator 218 also provides a gate drive signal to control MOSFET switch 202 through the line 250. Also connected to node 206 is a resistive divider coupling node 206 to ground through resistor 252 which is connected via node 256 to resistor 254 which resistor 254 is coupled to circuit ground. Node 256, which is the tap point of the resistive divider comprising resistors 252 and 254, is coupled via a line 262 to the address port 258 of CPU 76. In operation, the power supply shown in FIG. 3b operates similarly to the power supply shown in FIG. 3a to supply unregulated DC voltage at node 206 to the voltage regulator 218, which in turn provides the operating +5 volts DC for the CPU 76 in the electronic circuit breaker. The unregulated DC voltage at node 206 is also divided down by a resistive voltage divider to provide a sense signal and cause CPU 76 to produce a control signal to cause retention of data under conditions of power interruption or fault. Again, the values of the resistors in the resistive voltage divider comprising resistors 252 and 254 are specified to correspond to the minimum limit value of the ripple component of the unregulated DC voltage present at node 206. In the illustrative example shown, the divider ratio is 1÷5, which, when multiplied by the 8 volt limit, means that the voltage present at the address line at terminal 258 of CPU 76 is approximately 1.6 volts. An internal comparator function within CPU 76 senses when the voltage at address line 258 drops below the 1.6 volt value and accordingly causes generation of a control signal, to cause retention of data.

It will be appreciated by those skilled in the art that FIG. 3 illustrates a hardware solution in FIG. 3a and a software solution in FIG. 3b to provide a signal used to cause the retention of data in the event of a decrease of the voltage provided to the electronic circuit breaker 10 by the power supply shown in FIG. 3. It will also be appreciated that this unregulated voltage is responsive to two conditions in the electronic circuit breaker 10: (1) loss, reduction, or interruption of the AC voltage present at terminal 260; and (2) the effect on the unregulated DC voltage at node 206 by the variations that may occur in current delivered to the load. Thus the sense signal provided at node 262 in FIG. 3a and node 256 in FIG. 3b are responsive to both the AC input voltage and the DC voltage of the power supply for the electronic circuit breaker. These two conditions together provide a reliable indicator of the loss of sufficient voltage to continue operation of the electronic circuit breaker 10 and thus are a suitable indication that the circuit breaker CPU 76 must initiate a routine to cause the retention of data before the electronic circuit breaker becomes inoperative because of a loss of supply voltage to it.

Other signals may be monitored to generate a control signal for retaining parameter information in the event of a power interruption or failure event. One of the routine functions performed in the electronic circuit breaker of the present disclosure is the periodic measurement of the AC voltage present at the input to the circuit breaker power supply. See, e.g., FIG. 18 of U.S. Pat. No. 5,875,087, assigned to the assignee of the present disclosure and incorporated herein by reference. Any such AC voltage reading may be used as an indicator of power interruption or failure. Another signal responsive to a power interruption or failure is the DC charging current in the filter capacitor of the power supply for the electronic circuit breaker shown in FIG. 3 of the present disclosure. Although not shown in FIG. 3, the DC charging current may be monitored anywhere in the charging current path shown in the figure by placing a current sensor at a selected point in the circuit and coupling the output of the current sensor to a control input of the electronic circuit breaker to cause the circuit breaker to initiate the retention of data.

Although the preferred embodiment has been described in detail, it should be understood that various changes, substitutions and alterations can be made therein without departing from the spirit and scope of the invention as defined by the appended claims.

What is claimed is:

1. A method for retaining parameter information generated or received in an electronic circuit breaker, having a controller and operatively connected in a branch circuit coupled to a power source, upon occurrence of a power fault, comprising the steps of:

generating a control signal responsive to the power fault;

coupling the control signal to a control input of the circuit breaker; and storing, responsive to receipt of the control signal at the control input, parameter information about a condition external to the circuit breaker, which is generated or received in the electronic circuit breaker.

2. The method of claim 1, wherein the step of generating comprises:

monitoring a power signal output by the power source;

comparing the power signal with a reference signal; and outputting the control signal from an output terminal when the power signal falls below the reference signal.

3. The method of claim 2, wherein the step of coupling comprises coupling the output terminal to the control input.

4. The method of claim 2, wherein the step of monitoring comprises sensing AC voltage input to the branch circuit from the power source.

5. The method of claim 2, wherein the step of outputting comprises providing an interrupt signal to the circuit breaker controller if the present value is at least 10% less than the previous sample value.

6. The method of claim 2, wherein the step of monitoring comprises sensing the unregulated DC voltage of a power supply in the electronic circuit breaker.

7. The method of claim 2, wherein the step of outputting comprises providing an interrupt signal to the controller in the circuit breaker when the present value falls below the predetermined limit.

8. The method of claim 7, further comprising setting the predetermined limit at least 10% below the minimum full load value of the unregulated DC voltage.

9. The method of claim 2, wherein the step of monitoring comprises sensing DC charging current in a filter capacitor in the DC power supply in the electronic circuit breaker.

10. The method of claim 2, wherein the step of outputting comprises providing an interrupt signal to the controller in the circuit breaker when the present value falls below the predetermined limit.

11. The method of claim 10, further comprising setting the predetermined limit to at least 10% above the maximum full load peak value of the DC charging current.

12. The method of claim 2, wherein the step of outputting comprises providing a control interrupt to the controller in the circuit breaker.

13. The method of claim 1, wherein the step of storing comprises writing data representing the parameter information being retained to an EEPROM.

14. The method of claim 1, wherein the step of storing comprises writing data representing the parameter information being retained in a Static RAM.

15. A method for retaining parameter information generated or received in an electronic circuit breaker, having a controller and operatively connected in a branch circuit coupled to a power source, upon occurrence of a power fault, comprising the steps of:

generating a control signal responsive to the power fault;

coupling the control signal to a control input of the circuit breaker; and storing, responsive to receipt of the control signal at the control input, parameter information generated or received in the electronic circuit breaker, by charging a storage capacitor to a predetermined value corresponding to the parameter information being retained in the circuit breaker.

16. A method for retaining parameter information generated or received in an electronic circuit breaker that is operatively connected in a branch circuit coupled to a power source, upon occurrence of a power source fault, comprising the steps of:

comparing a signal proportional to the power source signal with a reference signal;

outputting a control signal from an output terminal when the power source signal falls below the reference signal;

coupling the control signal to a control input of the circuit breaker; and saving, responsive to receipt of the control signal at the control input, the parameter information generated in or received in the electronic circuit breaker by charging a back-up capacitor to a predetermined value.

17. The method of claim 16, wherein an AC voltage signal from the power source is defined as the signal proportional to the power source signal.

18. The method of claim 16, wherein an unregulated DC voltage present in a DC power supply in the electronic circuit breaker is defined as the signal proportional to the power source signal.

19. The method of claim 16, wherein DC charging current in a filter capacitor in a DC power supply in the electronic circuit breaker is defined as the signal proportional to the power source signal.

20. A method for retaining parameter information generated or received in an electronic circuit breaker that is operatively connected in a branch circuit coupled to a power source, upon occurrence of a power source fault, comprising the steps of:

comparing a signal proportional to the power source signal with a reference signal;

outputting a control signal from an output terminal when the power source signal falls below the reference signal;

coupling the control signal to a control input of the circuit breaker; and storing, responsive to the receipt of the control signal at said control input, parameter information about a condition external to the circuit breaker, which is generated or received in the electronic circuit breaker, in an EEPROM.

21. The method of claim 20, wherein an AC voltage signal from the power source is defined as the signal proportional to the power source signal.

22. The method of claim 20, wherein an unregulated DC voltage present in a DC power supply in the electronic circuit breaker is defined as the signal proportional to the power source signal.

23. The method of claim 20, wherein DC charging current in a filter capacitor in a DC power supply in the electronic circuit breaker is defined as the signal proportional to the power source signal.

24. A method for retaining parameter information generated or received in an electronic circuit breaker that is operatively connected in a branch circuit coupled to a power source, upon occurrence of a power source fault, comprising the steps of:

comparing a signal proportional to the power source signal with a reference signal;

outputting a control signal from an output terminal when the power source signal falls below the reference signal;

coupling the control signal to a control input of the circuit breaker; and storing, responsive to the receipt of the control signal at said control input, parameter information about a condition external to the circuit breaker. which is generated or received in the electronic circuit breaker, in an SRAM.

25. The method of claim 24, wherein an AC voltage signal from the power source is defined as the signal proportional to the power source signal.

26. The method of claim 24, wherein an unregulated DC voltage present in a DC power supply in the electronic circuit breaker is defined as the signal proportional to the power source signal.

27. The method of claim 24, wherein DC charging current in a filter capacitor in a DC power supply in the electronic circuit breaker is defined as the signal proportional to the power source signal.

28. An apparatus for retaining parameter information generated or received in an electronic circuit breaker, having a controller and operatively connected in a branch circuit coupled to a power source, upon occurrence of a power fault, comprising:

means for generating a control signal responsive to said power fault;

means for coupling said control signal to a control input of said circuit breaker; and means for storing, responsive to receipt of said control signal at said control input, parameter information about a condition external to the circuit breaker, which is generated or received in said electronic circuit breaker.

29. The apparatus of claim 28, wherein said means for generating comprises:

means for monitoring a power signal output by said power source;

means for comparing said power signal with a reference signal; and means for outputting said control signal from an output terminal when said power signal falls below said reference signal.

30. The apparatus of claim 29, wherein said means for coupling comprises means for-coupling said output terminal to said control input.

31. The apparatus of claim 29, wherein said means for monitoring comprises means for sensing an AC voltage input to said branch circuit from said power source.

32. The apparatus of claim 29, wherein said means for outputting comprises means for providing an interrupt signal to the circuit breaker controller if the present value is at least 10% less than the previous sample value.

33. The apparatus of claim 29, wherein said means for monitoring comprises means for sensing the unregulated DC voltage of a power supply in said electronic circuit breaker.

34. The apparatus of claim 29, wherein said means for outputting comprises
means for providing an interrupt signal to the controller in the circuit breaker when the present value falls below the predetermined limit.

35. The apparatus of claim 34, wherein the predetermined limit is at least 10% below the minimum full load value of the unregulated DC voltage.

36. The apparatus of claim 29, wherein said means for monitoring comprises means for sensing DC charging current in a filter capacitor in said DC power supply in said electronic circuit breaker.

37. The apparatus of claim 29, wherein the means for outputting comprises
means for providing an interrupt signal to the controller in the circuit breaker when the present value falls below the predetermined limit.

38. The apparatus of claim 37, wherein the predetermined limit is at least 10% above the maximum full load peak value of the DC charging cycle.

39. The apparatus of claim 29, wherein said means for comparing comprises means for comparing the signal being monitored in a comparator and outputting a control interrupt to said electronic circuit breaker.

40. The apparatus of claim 28, wherein said means for storing comprises means for writing said parameter information being retained to an EEPROM.

41. The apparatus of claim 28, wherein the means for storing comprises means for writing said parameter information being retained in a Static RAM.

42. An apparatus for retaining parameter information generated or received in an electronic circuit breaker, having a controller and operatively connected in a branch circuit coupled to a power source, upon occurrence of a power fault, comprising:
means for generating a control signal responsive to said power fault;
means for coupling said control signal to a control input of said circuit breaker; and
means for storing, responsive to receipt of said control signal at said control input, parameter information generated or received in said electronic circuit breaker by charging a storage capacitor to a predetermined value corresponding to said parameter information being retained in said circuit breaker.

43. An apparatus for retaining parameter information generated or received in an electronic circuit breaker that is operatively connected in a branch circuit coupled to a power source, upon occurrence of a power source fault, comprising:
means for comparing a signal proportional to said power source signal with a reference signal;
means for outputting a control signal from an output terminal when said power source signal falls below said reference signal;
means for coupling said control signal to a control input of said circuit breaker; and
means for saving, responsive to receipt of said control signal at said control input, said parameter information generated in or received in said electronic circuit breaker by charging a back-up capacitor to a predetermined value responsive to receipt of said control signal at said control input.

44. The apparatus of claim 43, wherein said means for comparing defines an AC voltage signal from said power source as a signal proportional to said power source signal.

45. The apparatus of claim 43, wherein said means for comparing defines an unregulated DC voltage present in a DC power supply in said electronic circuit breaker as said signal proportional to said power source signal.

46. The apparatus of claim 43, wherein said means for comparing defines DC charging current in a filter capacitor in a DC power supply in said electronic circuit breaker as said signal proportional to said power source signal.

47. An apparatus for retaining parameter information generated or received in an electronic circuit breaker that is operatively connected in a branch circuit coupled to a power source, upon occurrence of a power source fault, comprising:
means for comparing a signal proportional to said power source signal with a reference signal;
means for outputting a control signal from an output terminal when said power source signal falls below said reference signal;
means for coupling said control signal to a control input of said circuit breaker; and
means for storing, responsive to the receipt of said control signal at said control input, parameter information about a condition external to said circuit breaker which is generated or received in said electronic circuit breaker, in an EEPROM.

48. The apparatus of claim 47, wherein said means for comparing defines an AC voltage signal from said power source as a signal proportional to said power source signal.

49. The apparatus of claim 47, wherein said means for comparing defines an unregulated DC voltage present in a DC power supply in said electronic circuit breaker as said signal proportional to said power source signal.

50. The apparatus of claim 47, wherein said means for comparing defines DC charging current in a filter capacitor in a DC power supply in said electronic circuit breaker as said signal proportional to said power source signal.

51. An apparatus for retaining parameter information generated or received in an electronic circuit breaker that is operatively connected in a branch circuit coupled to a power source, upon occurrence of a power source fault, comprising:
means for comparing a signal proportional to said power source signal with a reference signal;
means for outputting a control signal from an output terminal when said power source signal falls below said reference signal;
means for coupling said control signal to a control input of said circuit breaker; and
means for storing, responsive to the receipt of said control signal at said control input, parameter information about a condition external to said circuit breaker which is generated or received in said electronic circuit breaker, in an SRAM.

52. The apparatus of claim 51, wherein said means for comparing defines an AC voltage signal from said power source as a signal proportional to said power source signal.

53. The apparatus of claim 51, wherein said means for comparing defines an unregulated DC voltage present in a DC power supply in said electronic circuit breaker as said signal proportional to said power source signal.

54. The apparatus of claim 51, wherein said means for comparing defines DC charging current in a filter capacitor in a DC power supply in said electronic circuit breaker as said signal proportional to said power source signal.

* * * * *